(12) United States Patent
Tao et al.

(10) Patent No.: US 7,619,823 B2
(45) Date of Patent: Nov. 17, 2009

(54) 1D AND 2D COMPOSITE LENTICULAR FILMS AND FABRICATION METHODS

(75) Inventors: Xiao-ming Tao, Hong Kong (HK); Xiaohong Sun, Hong Kong (HK)

(73) Assignee: Hong Kong Polytechnic University, Hong Kong (CN)

( * ) Notice: Subject to any disclaimer, the term of this patent is extended or adjusted under 35 U.S.C. 154(b) by 88 days.

(21) Appl. No.: 11/957,112

(22) Filed: Dec. 14, 2007

(65) Prior Publication Data

US 2009/0153959 A1 Jun. 18, 2009

(51) Int. Cl.
*G02B 27/10* (2006.01)

(52) U.S. Cl. .................. 359/620; 359/621; 359/622

(58) Field of Classification Search ............. 359/454, 359/455, 463, 619, 620, 621, 622; 362/619, 362/622, 627
See application file for complete search history.

(56) References Cited

U.S. PATENT DOCUMENTS

| 4,414,316 | A | 11/1983 | Conley |
| 6,000,332 | A | 12/1999 | Hruby et al. |
| 6,726,858 | B2 | 4/2004 | Andrews |
| 2002/0038917 | A1 | 4/2002 | McKee |
| 2008/0192356 | A1* | 8/2008 | Hamagishi ............. 359/619 |

OTHER PUBLICATIONS

Wang, B., et al., "New high refractive index organic/inorganic hybrid materials from sol-gel processing", Macromolecules, 24, pp. 3449-3450, (1991).
Olshavsky, M.A., et al., "Polyphosphazenes with high refractive indices: synthesis, characterization, and optical properties", Macromolecules, 28, pp. 6188-6197, (1995).
Kyprianidou-Leodidou, T., et al., "High refractive index materials of iron sulfides and poly(ethylene oxide)", Journal of Materials Research, vol. 12, No. 8, pp. 2198-2206, (1997).
Kyprianidou-Leodidou, T., et al., "Size variation of PbS particles in high-refractive-index nanocomposites", J. Phys. Chem., 98, pp. 8992-8997, (1994).
Chang, C.C., et al., "High-refractive-index thin films prepared from aminoalkoxysilane-capped pyromellitic dianhydride-titania hybrid materials", Journal of Polymer Science: Part A: Polymer Chemistry, vol. 39, pp. 3419-3427, (2001).
Nussbaumer, R.J., et al., "Polymer-TiO$_2$ nanocomposites: a route towards visually transparent broadband UV filters and high refractive index materials", Macromol. Mater. Eng., 288, pp. 44-49, (2003).
Lü, C., et al., "Research on preparation, structure and properties of TiO$_2$/polythiourethane hybrid optical films with high refractive index", Macromol. Mater. Eng., 288, pp. 717-723, (2003).

(Continued)

*Primary Examiner*—David N Spector
(74) *Attorney, Agent, or Firm*—George G. Wang; Wilkinson & Grist

(57) ABSTRACT

A composite lenticular film includes a first layer having a first refractive index, and a second layer having a second refractive index less than the first refractive index. The second layer is integrally attached to the first layer. The first layer has at least one row of protruding lenses.

21 Claims, 4 Drawing Sheets

OTHER PUBLICATIONS

Lü, C., et al., "Preparation and characterization of ZnS-polymer nanocomposite films with high refractive index", J. Mater. Chem., 13, pp. 2189-2195, (2003).

Lü, C., et al., "High refractive index thin films of ZnS/polythiourethane nanocomposites", J. Mater. Chem., 13, pp. 526-530, (2003).

Zimmermann, L., et al., "High refractive index films of polymer nanocomposites", J. Mater. Res., vol. 8, No. 7, pp. 1742-1748, (1993).

Lee, L.H., et al., "High-refractive-index thin films prepared from trialkoxysilane-capped poly(methylmethacrylate)-titania materials", Chem. Mater., 13, pp. 1137-1142, (2001).

Weibel, M., et al., "Preparation of polymer nanocomposites with 'ultrahigh' refractive index", Polymers for Advanced Technologies, vol. 2, pp. 75-80, (1991).

* cited by examiner

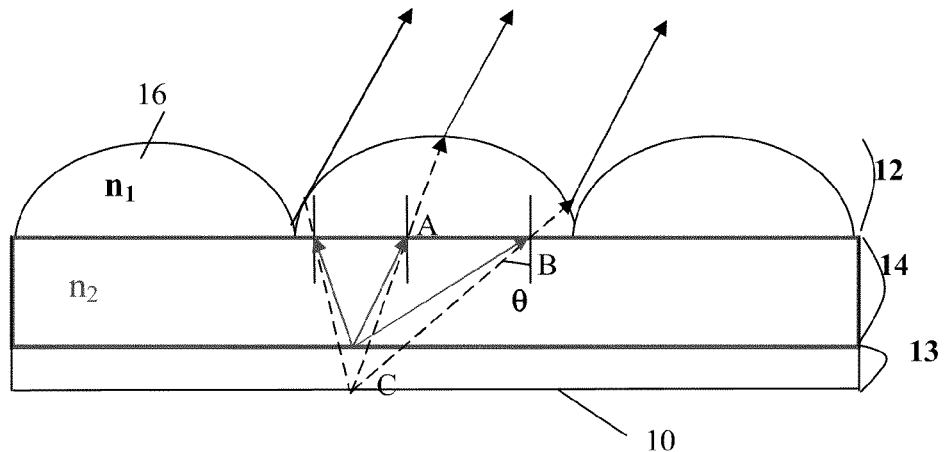
FIG. 1
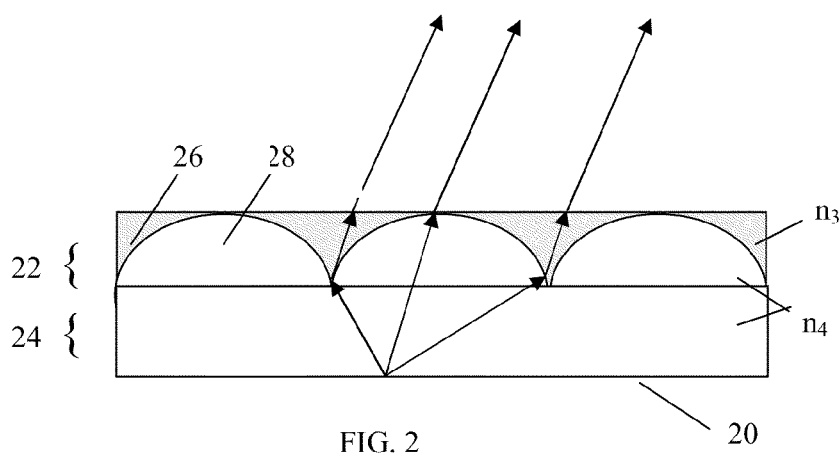
FIG. 2
Error!
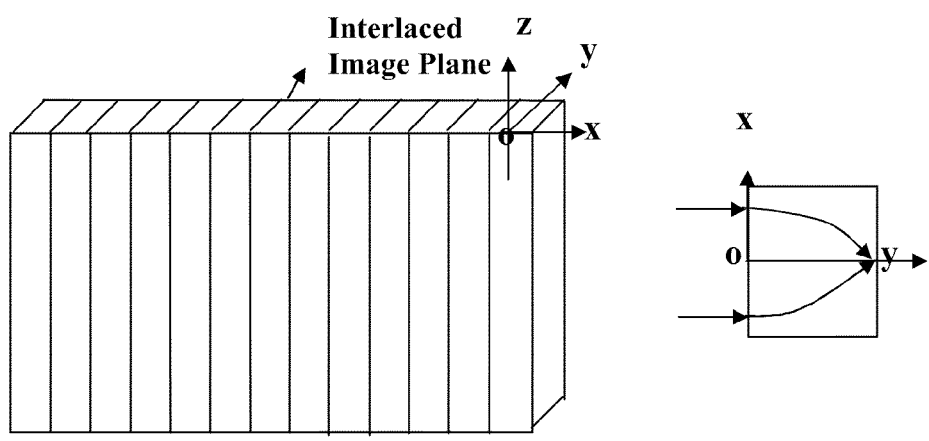
FIG. 3A
FIG. 3B

1D AND 2D COMPOSITE LENTICULAR FILMS AND FABRICATION METHODS

BACKGROUND

Traditional lenticular sheets have a planar surface on one side and a plurality of semi-cylindrical lenses on the other side. The semi-cylindrical lenses, or lenticules, are usually arranged side-by-side in a plane, each extending in the same direction. On the planar surface a lenticular image is often printed. Simple lenticular images may provide two different images, depending on the viewing angle. More complex lenticular images may provide animated images or three-dimensional (3D) images.

A lenticular image may be generated in a variety of ways. An image may be printed on an image carrier such as paper or polymer sheet, followed by alignment and attachment of a lenticular sheet to the image. An interlaced image may be printed directly on the back side of lenticular lenses. An interlaced image may be directly exposed onto a photosensitive material laminated on the lenticular sheets.

Conventional lenticular materials include poly(vinyl chloride) (PVC), poly(ethylene terephthalate) (PET) and acrylic materials. However, these materials are thick and rigid, and cannot typically be curved or folded into desired shapes. While it is highly desirable to fabricate flexible lenticular sheets that can be affixed to textiles or fabrics, flexibility allows for more deformation of lenticules under the large pressures encountered in printing processes, which can make the images blur and can negatively affect the 3D or animation effect.

Consequently, it is desirable to have composite lenticular films with stereo-effect patterns that have minimal deformation. It is also desirable to manufacture composite lenticular films that are thinner and more flexible, yet can have high quality printing and desired optical effects. Moreover, it is desirable to develop a deformation calibration process to fabricate lenticular images.

BRIEF SUMMARY

According to one aspect, a composite lenticular film includes a first layer having a first refractive index, and a second layer having a second refractive index integrally attached to the first layer. The first layer has rows of protruding lenses, and the first refractive index is greater than the second refractive index.

According to one aspect, a composite lenticular film includes a sheet of Gradient Refractive Index lenses. The sheet has a thickness equal to the focal length of the Gradient Refractive Index lenses.

According to a further aspect, a method of making a composite lenticular film includes mixing a UV sensitive ink with high refractive index nanoparticles to form a high refractive glue, and digitally printing the glue on a low refractive index plastic film.

According to yet another aspect, a method of making a composite lenticular film includes obtaining a mold having a concave lens sheet, filling a solution of a polymer nanocomposite into the mold, and solidifying the solution to form a convex lens sheet.

BRIEF DESCRIPTION OF THE DRAWINGS

FIG. 1 depicts a composite lenticular film having a double-layer structure.

FIG. 2 depicts a composite lenticular film having a composite material structure.

FIG. 3 depicts a composite lenticular film having a double-plane gradient-index structure with a 1-D Gradient Refractive Index lens sheet.

DETAILED DESCRIPTION

Figure 4A:
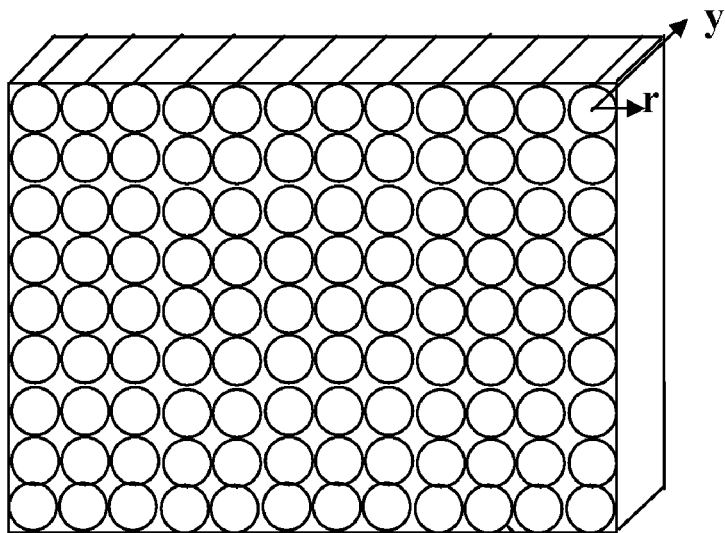
FIG. 4 depicts a composite lenticular film having a double-plane gradient-index structure with a 2-D Gradient Refractive Index lens sheet.

Reference will now be made in detail to a particular embodiment of the invention, examples of which are also provided in the following description. Exemplary embodiments of the invention are described in detail, although it will be apparent to those skilled in the relevant art that some features that are not particularly important to an understanding of the invention may not be shown for the sake of clarity.

Furthermore, it should be understood that the invention is not limited to the precise embodiments described below and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims. In addition, improvements and modifications which may become apparent to persons of ordinary skill in the art after reading this disclosure, the drawings, and the appended claims are deemed within the spirit and scope of the present invention.

Double-Layer Structures

In one embodiment, the composite lenticular film 10 may include a double-layer structure, as depicted in FIG. 1, which may include a second layer 14 coated on a first layer 12. The first layer 12 may include at least one row of lenses 16, with the lens curvature facing away from the second layer 14. For example, the lenses 16 may be semi-spherical or semi-cylindrical in structure. The solid line arrows and dash line arrows depict how light rays may propagate through the composite lenticular film 10.

The first layer 12 has a refractive index $n_1$, and the second layer 14 has a refractive index $n_2$. Preferably, the refractive index $n_1$ is larger than the refractive index $n_2$, i.e., $n_1 > n_2$. For example, the refractive index $n_1$ may be larger than 1.5, and the refractive index $n_2$ may be less than 1.5.

Preferably, the first layer 12 is a layer of lenticular film, and the second layer 14 is a layer of transparent film. The lenticular film may be, for example, a high refractive index polymer film. Examples of high refractive index polymers include nylon 6.6 and nylon 6.10 (n=1.565), PET (poly(ethylene terephthalate), n=1.575), PC (polycarbonate, n=1.583~1.59), PS (polystyrene, n=1.59~1.592), PNVC (poly(N-vinyl-carbonate), n=1.683~1.696), PMMA (poly(methyl methacrylate), n=1.4893), transparent PU as used in optical lens (polyurethane, n=1.6) and ABS (acrylonitrile-butadiene-styrene, n=1.52). The first refractive $n_1$ of a layer including at least one of these polymers may be from about 1.5 to about 1.7. The transparent film may be, for example, a low refractive index polymer film. Examples of low refractive index polymers include PHFPO (hydroxypropyl cellulose, n=1.337), PCTFE (poly(methyl hydrosiloxane), n=1.397) and poly(dimethylsiloxane) (n=1.4035). The second refractive $n_2$ of a layer including at least one of these polymers may be from about 1.3 to about 1.4.

Inorganic materials may also be included in the layers 12 and/or 14 to provide nanocomposite materials with the desired refractive index. The refractive index of suitable inorganic materials may vary, and may include materials with low refractive index such as potassium (n=0.044) to materials with high refractive index such as aluminum antimonide (n=5.27).

In one example, semiconductor nanoparticles of metal sulfide may be introduced into the layer 12 to prepare a high refractive index nanocomposite. For example, nanoparticles of lead sulfide and iron sulfide may be introduced into poly(ethylene oxide) or gelatin to produce nanocomposites with high refractive index (n=3 for lead sulfide nanocomposites, and n=2.5~2.8 for iron sulfide nanocomposites).

If an inorganic material is present in a layer, it is preferred that the size of the inorganic domains is below one-tenth of the wavelength of visible light (400-800 nm). This may help avoid Rayleigh scattering and may provide transparent polymer nanocomposites. For example, the refractive index of $TiO_2$-polymer hybrid materials is about 2.

Preferably the composite lenticular film 10 is configured to be thinner than a single-material lenticular film by a thickness 13. Although not intended to be bound by theory, it is believed that the difference in thickness 13 between the composite lenticular film 10 and a single-material lenticular film is related to the difference in refractive indexes by:

$$\Delta d = \frac{4r\Delta n}{s \times n \times \sin 2\theta}$$

Where d (d=(ns−1)r/s(n−1)) denotes the film thickness of single-material lenticular sheet, n denotes the refractive index of the first layer 12, r denotes the radius of lenticules, s denotes view numbers, and θ denotes the incident angle of light ray in a single-material lenticular sheet (for example, θ may be chosen as π/4).

According to the above equation, a larger difference in refractive index (Δn) between the layers 12 and 14 correlates with a larger thickness difference 13 between the single-material lenticular sheet and the composite lenticular film 10. Thus, a larger difference in refractive index between the layers 12 and 14 can provide for a thinner composite lenticular film 10. Details of examples of thin composite lenticular films are shown in Table 1.

TABLE 1

Properties of composite lenticular films

| Double-layer lenticular sheet | Refractive Index | Number of LPI* and Views | Lenticular Radius (inch) | Thickness of double layers (inch) |
|---|---|---|---|---|
| 1 | $n_1 = 3$, $n_2 = 1.5$ | LPI = 100 lpi, s = 6 | 0.005 | $d_{n1} = 0.005$ $d_{n2} = 0.0004$ |
| 2 | $n_1 = 3$, $n_2 = 2$ | LPI = 100 lpi, s = 6 | 0.005 | $d_{n1} = 0.005$ $d_{n2} = 0.00098$ |
| 3 | $n_1 = 2$, $n_2 = 1.5$ | LPI = 100 lpi, s = 6 | 0.005 | $d_{n1} = 0.005$ $d_{n2} = 0.00333$ |
| 4 | $n_1 = 1.5$, $n_2 = 1.3$ | LPI = 100 lpi, s = 6 | 0.005 | $d_{n1} = 0.005$ $d_{n2} = 0.00786$ |

*LPI = lenticules per inch

For comparison, details of examples of single material lenticular sheets are shown in Table 2.

TABLE 2

Properties of single material lenticular sheets

| Single material lenticular sheet | Refractive Index | Number of LPI and Views | Lenticular Radius (inch) | Thickness of double layers (inch) |
|---|---|---|---|---|
| 1 | n = 3 | LPI = 100 lpi, s = 6 | 0.005 | d = 0.00708 |
| 2 | n = 2 | LPI = 100 lpi, s = 6 | 0.005 | d = 0.00916 |
| 3 | n = 1.5 | LPI = 100 lpi, s = 6 | 0.005 | d = 0.0133 |

Consequently, due to the difference in refractive indexes between the layers 12 and 14, the double-layer structure may decrease the thickness of the composite lenticular film 10, compared to a single-material lenticular sheet.

Lenticular sheets having a double-layered structure may be obtained by a digital printing method. In this method, UV sensitive ink may be mixed with high refractive index nanoparticles to form high refractive glue. Examples of high refractive index nanoparticles include $TiO_2$ or other semiconductor particles. The glue may then be digitally printed on the low refractive index plastic film to obtain dot-matrix structures in 2-D and grating structures in 1-D. The speed and the pixel number of the digital printing may be varied to fabricate different periods and shapes of lenticular sheets. For example, the lenticular sheet may include lenticules that are semi-spherical or semi-cylindrical in structure. Moreover, lenticular sheets having a double-layered structure may also be obtained by a coating method, such as coating methods known to one of ordinary skill in the art.

Composite Material Structures

In another embodiment, the composite lenticular film 20 may include a composite material structure, as depicted in FIG. 2, which may include a first layer 22 coated on a second layer 24. The second layer 24 may include at least one row of lenses 28, with the curvature of the lenses facing towards and embedded within the first layer 22. For example, the lenses 28 may be semi-spherical or semi-cylindrical in structure. The solid line arrows depict how light rays may propagate through the structure.

The first layer 22 has a refractive index $n_3$, and the second layer 24 has a refractive index $n_4$. Preferably, the refractive index $n_4$ is larger than the refractive index $n_3$, i.e., $n_4 > n_3$. For example, the refractive index $n_4$ may be from about 1.55 to about 3, and the refractive index $n_3$ may be less than 1.55.

Preferably, the first layer 22 includes a concave lens sheet 26, and the second layer 24 includes a convex lens sheet 28. For example, the concave lens sheet 26 may include rows of transparent film made of plastic materials such as PMMA or ABS, and may have a refractive index $n_3$ of from about 1.48 to about 1.53. The convex lens sheet 28 may be a high refractive index polymer film, as described above for first layer 12 in FIG. 1. The convex lens sheet 28 may also be filled with a high refractive index material, such as a nanocomposite.

The composite lenticular film 20 may be obtained, for example, by a filling method. In this method, the concave lens sheet 26 is used as a mold. A solution of a polymer nanocomposite with a high refractive index is filled into the mold and solidified to form the convex lens sheet 28. The thickness of composite lenticular film 20 may then be controlled by adjusting the quantity of the filling solution used to form the convex lens sheet 28.

Double-Plane Gradient-Index Structures

In a further embodiment, the composite lenticular films 30 and 30' may include a double-plane gradient-index structure, as depicted in FIGS. 3A and 4A, respectively. An example of a 1-D Gradient Refractive Index (GRIN) lens sheet 30 is depicted in FIG. 3A, and an example of a 2-D GRIN lens sheet 30' is depicted in FIG. 4A.

Figure 4B:
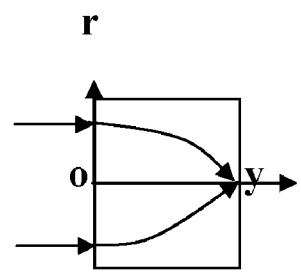

Specifically, the composite lenticular film 30 or 30' may include a lens sheet that is fabricated from GRIN materials. The solid line arrows in the FIGS. 3B and 4B depict how light rays may propagate through a unit lens of a GRIN lenticular films 30 and 30', respectively. The thickness of the lenticular films 30 or 30' is equal to the focal length of the respective GRIN lenses. The refractive index distributions may be described as follows:

$$n(x) = n_0\left(1 - \frac{1}{2}\alpha^2 x^2\right) \text{ for a 1-}D \text{ lens; and}$$

$$n(r) = n_0\left(1 - \frac{1}{2}\alpha^2 r^2\right) \text{ for a 2-}D \text{ lens,}$$

where $n_0$ denotes the refractive index of the central plane (YOZ in FIG. 3A) or the central axis (OY in FIG. 3B), and $\alpha = \sqrt{2\Delta}/a$ and denotes the focus constant.

The pitch P of a lenticular film is $P=2\pi/\alpha$. The shortest focal plane is at P/4. The pitch is the period of the light rays propagating in the GRIN material. A one-pitch lens may deliver the output beam in the same position as the input beam. For example, when the radius of GRIN lens a=0.1 mm, $\Delta$=0.01, the focal length or the thickness of GRIN lens is 0.47 mm.

Calibration Process

Figure 5:
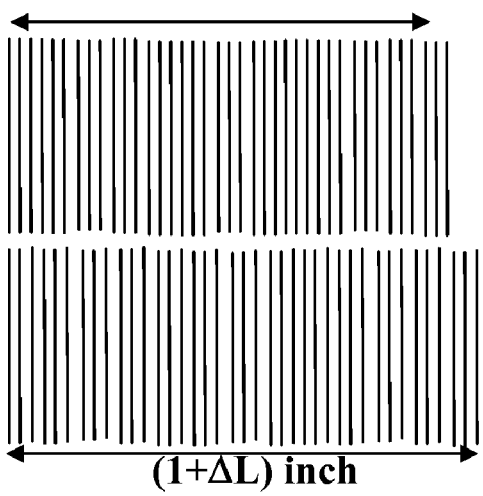
FIG. 5 depicts the calibration of an interlaced image resulting from the sheet deformation during printing process when an image is printed on a lenticular sheet directly.

High quality print and display effect in the composite lenticular films 10, 20, 30 or 30' may be realized using a calibration process to adjust for the deformation of the printed material. When an interlaced image is printed on a planar surface of the lenticular film 10, 20, 30 or 30' directly, the deformation $\Delta L$/inch of lenticular film 10, 20, 30 or 30' that occurred during the printing process may be measured. An interlaced image may be an image with a combination of multi-view images. To rectify the deformation, the LPI number of the interlaced image may be preset as $N_{LPI}/(1+\Delta L)$, where $N_{LPI}$ is the original number of the lenticular sheet. Examples of an original interlaced image and an interlaced image rectified for deformation are represented in FIG. 5.

Figure 6:
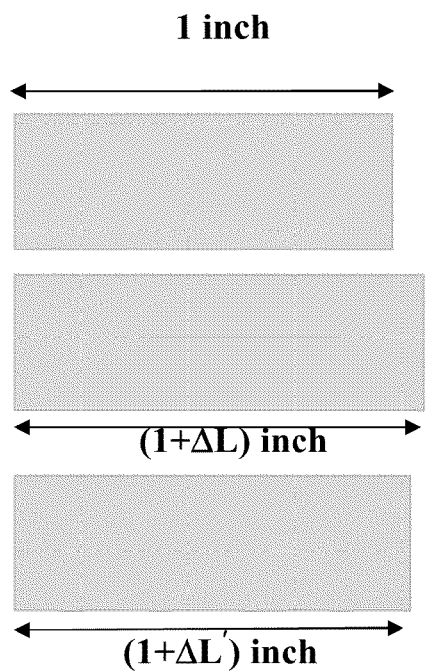
FIG. 6 depicts the calibration of an interlaced image resulting from the sheet deformation during printing process when an image is printed on the fabric and affixed to a lenticular sheet.

When an interlaced image is transfer-printed on a fabric, deformation of the fabric that occurred during the printing process and after the printing process are $\Delta L$/inch and $\Delta L'$/inch, respectively. To rectify the deformation, the LPI number of the interlaced image may be preset as $N_{LPI}/(1-\Delta L+\Delta L')$, as depicted in FIG. 6.

Figure 7:
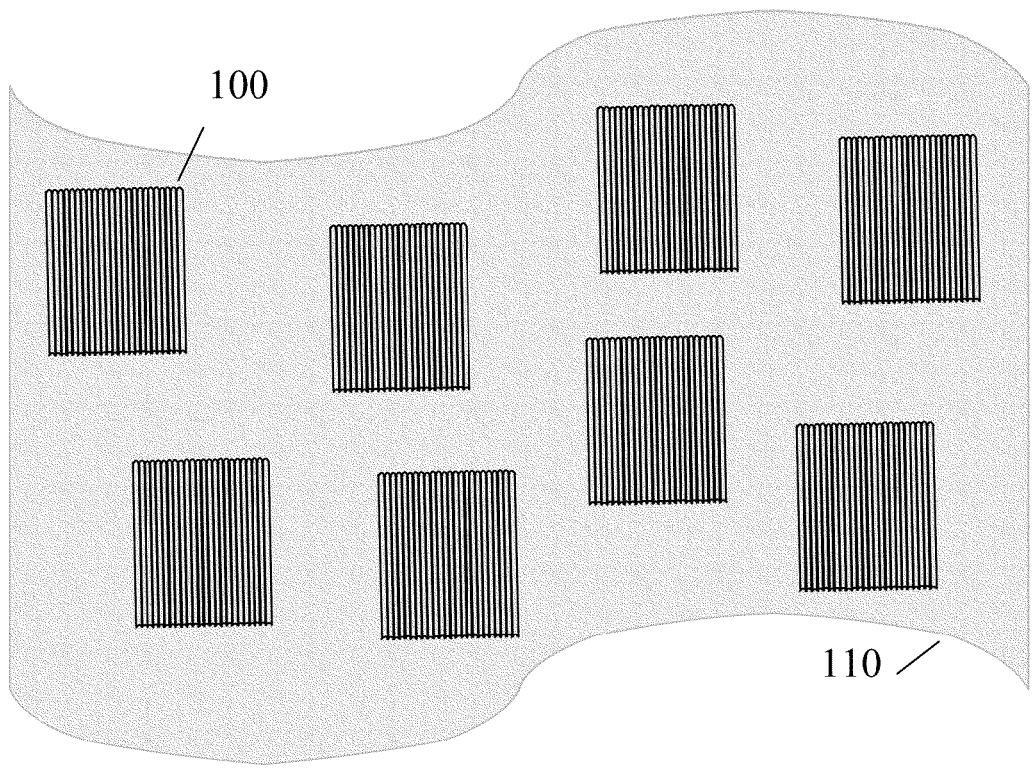
FIG. 7 depicts the composite lenticular film of FIG. 1 printed with interlacing images and affixed to a piece of fabric.
Figure 8:
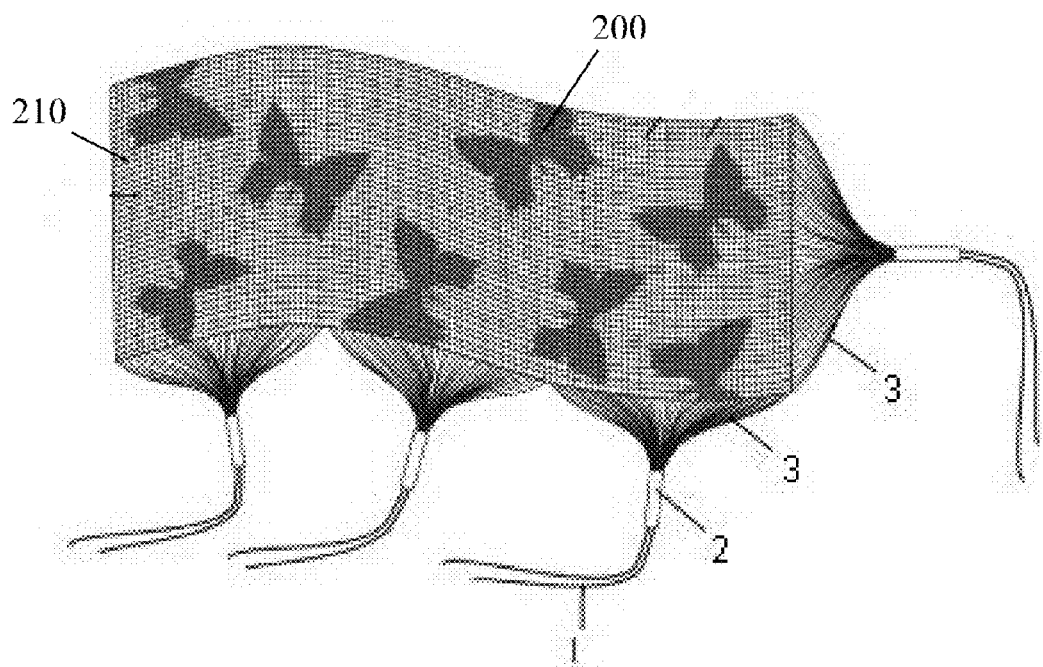
FIG. 8 depicts the composite lenticular film of FIG. 1 printed with interlacing images and affixed to a piece of luminescent fabric.
Figure 9:
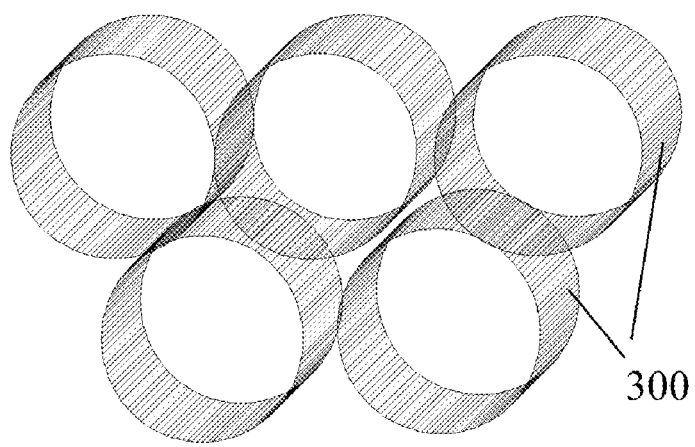
FIG. 9 depicts the composite lenticular film of FIG. 1 curled to form a symbol of the Olympic games.

The composite lenticular films such as 10, 20, 30 and 30' may find applications in clothing. For example, FIG. 7 depicts a lenticular film 100 printed with interlacing images and affixed to a piece of fabric 110. FIG. 8 depicts a lenticular film 200 printed with interlacing images and affixed to a piece of fabric 210. The composite lenticular films such as 10, 20, 30 and 30' also may be curled or deformed into desired shapes. For example, FIG. 9 depicts a composite lenticular film 300 as used in the symbol of the Olympic game.

What is claimed is:

1. A composite lenticular film, comprising:
   a first layer having a first refractive index; and
   a second layer having a second refractive index less than said first refractive index, said second layer integrally attached to said first layer,
   wherein said first layer comprises at least one row of protruding lenses.

2. The film of claim 1, wherein said first layer comprises a lenticular film, and said second layer comprises a transparent film.

3. The film of claim 2, wherein said first refractive index is greater than 1.5.

4. The film of claim 3, wherein said first refractive index is from about 1.5 to about 1.7.

5. The film of claim 3, wherein said lenticular film comprises a high refractive index polymer selected from the group consisting of nylon, PET, PC, PS, PNVC, PMMA, PU and ABS.

6. The film of claim 2, wherein said second refractive index is less than 1.5.

7. The film of claim 6, wherein said second refractive index is from about 1.3 to about 1.4.

8. The film of claim 6, wherein said layer of transparent film comprises low refractive index polymer selected from the group consisting of PHFPO, PCTFE and poly(dimethylsiloxane).

9. The film of claim 2, wherein said first layer further comprises semiconductor nanoparticles of metal sulfide.

10. The film of claim 2, further comprising an inorganic material having a refractive index from about 0.044 to about 5.27.

11. The film of claim 10, wherein said inorganic material comprises potassium.

12. The film of claim 10, wherein said inorganic material comprises aluminum antimonide.

13. The film of claim 1, wherein said at least one row of lenses are protruding away from said second layer.

14. The film of claim 13, wherein said lenses are semispherical in structure.

15. The film of claim 13, wherein said lenses are semicylindrical in structure.

16. The film of claim 1, wherein said first layer comprises a convex lens sheet, and said second layer comprises a concave lens sheet.

17. The film of claim 16, wherein said second refractive index is less than 1.55.

18. The film of claim 17, wherein said concave lens sheet comprises a transparent plastic film selected from the group consisting of PMMA and ABS.

19. The film of claim 16, wherein said first refractive index is higher than 1.55.

20. The film of claim 19, wherein said convex lens sheet comprises a high refractive index polymer selected from the group consisting of nylon, PET, PC, PS, PNVC, and polymer nanocomposites.

21. An article of clothing, comprising a piece of fabric and the film of claim 1 attached to said piece of fabric.

* * * * *